United States Patent [19]

Shin

[11] 4,181,746
[45] Jan. 1, 1980

[54] PROCESS FOR PREPARING STEAM-KNEADED VERMICELLI PRODUCTS

[76] Inventor: Seon H. Shin, Mitatsunamachi Mansion No 1903, 2-3-34 Mita, Minatoku, Tokyo, Japan

[21] Appl. No.: 835,770

[22] Filed: Sep. 22, 1977

[30] Foreign Application Priority Data

Oct. 30, 1976 [JP] Japan ................................. 51-130712

[51] Int. Cl.² ............................................. A23L 1/16
[52] U.S. Cl. .................................. 426/335; 426/451; 426/511; 426/557
[58] Field of Search ............... 426/557, 451, 510, 511, 426/321, 335

[56] References Cited

U.S. PATENT DOCUMENTS

| | | | |
|---|---|---|---|
| 1,660,839 | 2/1928 | Herendeen | 426/511 |
| 2,819,969 | 1/1958 | Grandel | 426/557 |
| 3,162,536 | 12/1964 | Kaufmann | 426/557 |
| 3,979,525 | 9/1976 | Plemons | 426/335 |

FOREIGN PATENT DOCUMENTS 1937881  2/1971  Fed. Rep. of Germany ........... 426/557

*Primary Examiner*—Raymond N. Jones
*Assistant Examiner*—Elizabeth A. Hatcher
*Attorney, Agent, or Firm*—Fred Philpitt

[57] ABSTRACT

The present invention relates to a process for preparing a vermicelli product by kneading a mixture of water and vermicelli material in the presence of compressed steam so as to elevate the temperature of the vermicelli material to a temperature of 50° C. within a period of 15–60 seconds and continuing steam kneading until the temperature of the vermicelli material is elevated to at least 90° C.

9 Claims, 3 Drawing Figures

PROCESS FOR PREPARING STEAM-KNEADED VERMICELLI PRODUCTS

BACKGROUND

Vermicelli is an alimentary paste that has been made into long thin solid strings smaller in diameter than spagetti. The composition of the vermicelli starting material primarily consists of wheat flour together with minor amounts of other ingredients and additives. This invention relates to a method for converting any known vermicelli starting material (i.e. "vermicelli material") into a vermicelli paste. Thus, whereas various vermicelli materials are mentioned hereinafter, the invention is applicable to any vermicelli starting material, regardless of its composition.

According to conventional methods for preparing steam-kneaded vermicelli pastes, water is first supplied to a vermicelli material and after a certain time, steam is supplied. The temperature of the supplied water is room temperature or sometimes tepid water is used. In general the temperature of the supplied water is in the range of about 20° to about 30° C. Further, the temperature of the supplied steam is ordinarily in the range of 90° to 110° C. (0.3 to 0.4 Kg/cm²). Vermicelli pastes and vermicelli products prepared under these conditions are poor in viscoelasticity and are unstable with regard to properties such as water retention, water resistance and shape retention. Further, they are lacking in taste and eating feel.

OBJECTS

It is a primary object of the present invention to provide a process for preparing vermicelli products of excellent appearance, texture, eating feel, digestibility, processability, and boiling time.

Another object of the present invention is to provide a process for preparing vermicelli pastes in which the time required for the preparation of vermicelli pastes can be substantially shortened compared to conventional methods and the operational efficiency can be remarkably enhanced.

Still another object of the present invention is to provide a process for preparing vermicelli products which have a good processability and are characterized in that the time required for boiling during the processing step can be substantially shortened.

A further object of the present invention is to provide a process for preparing vermicelli products which are excellent in the preservability and which do not deteriorate even if stored for a long time.

THE PRESENT INVENTION

As a result of research I have concluded that in conventional methods the decomposing enzymes contained in the starting wheat flour, which act on starch as the main component of wheat flour and proteins, exert the decomposing action prominently to render properties unstable and cause degradation of eating feel and taste.

It was also found that the decomposing enzymes are activated by the presence of water and their activity is greatly influenced by the temperature, though the activity is also influenced to some extent by pH.

As the known main starch-decomposing enzymes there can be mentioned α-amylase and β-amylase. The former enzyme liquifies natural starch contained in the vermicelli material and converts it to dextrin, and the latter enzyme acts on gelatinized starch and partially liquifies gelatinized starch to convert it to maltose. As the protein-decomposing enzyme, there can be mentioned protease. This enzyme acts on gluten contained in the vermicelli material to decompose it and loosen the texture of the vermicelli paste. Aging of bread dough has been conducted by utilizing the activity of this protease, but in the case of vermicelli pastes, use of this decomposing enzyme is not preferred.

Activating temperature ranges and other activity characteristics of these are taught to be as shown in Table 1 (derived from "Wheat" by Hlynka, published in 1964).

Table 1

Conditions for Activation of Wheat Flour Enzymes

| Enzyme | Temperature (° C.) | Activity (%) | pH | Remarks |
|---|---|---|---|---|
| α-Amylase (starch-liquefying enzyme) | 60–66 | 100 | 4.5 | activity is lowered at pH lower than 4.0 and higher than 5.0 |
|  | 70 | 60 |  |  |
|  | 80 | 40 |  |  |
|  | 95 | 0 |  |  |
| β-Amylase (starch-diastatic enzyme) | 48–51 | 100 | 4.8 |  |
|  | 60 | 50 | 5.4 |  |
|  | 70 | 20 |  |  |
|  | 80 | 0 |  |  |
| Protease (protein-decomposing enzyme) | 45 | 100 | 3.2 | optimum pH is 3 to 4; ordinary wheat/germ wheat ratio is 1/20 |
|  | 50 | 70 |  |  |
|  | 70 | 0 |  |  |
|  | 100 | 0 |  |  |

These results, however, are not completely in agreement with results of experiments made by me. According to my experiments, the following facts have been confirmed.

α-Amylase has a high activity at temperatures of 32° to 42° C. and it is construed that the deactivation temperature is 55° to 60° C. β-Amylase is deactivated at about 48° C. and it is construed that the deactivation temperature of protease is about 45° C. Speeds of these enzymatic decomposition reactions are doubled every time the temperature is elevated by about 10° C. and as the temperature approximates the deactivation temperature, the speed of each decomposition reaction is drastically elevated. However, when the temperature is elevated beyond the deactivation temperature, the decomposition is terminated promptly. This relation can be represented by the following formula:

$$\text{Temperature coefficient } Q_{10} = \frac{\text{reaction speed at } (t + 10)° \text{ C.}}{\text{reaction speed at } t° \text{ C.}} = 2.0$$

The deactivation temperature of α-amylase is a little higher than 50° C. and even if the paste temperature exceeds 50° C., the decomposing activity still remains. However, if all the enzymes are taken into consideration, the average deactivation temperature is about 50° C. and it may be assumed that when the paste temperature reaches 50° C., all the enzymes in the vermicelli paste are deactivated.

Accordingly, if during the kneading treatment and just after water has been supplied, the temperature of the vermicelli material is elevated to a level higher than the enzyme deactivating temperature to thereby diminish the activity of the enzymes as much as possible, the bad influences of the decomposing enzymes on the properties of the vermicelli paste can be avoided.

The present invention centers around the above concept. In conventional methods the temperature of the supplied water is room temperature or sometimes tepid water is supplied. When a certain time has passed after the supply of water, steam is supplied under a pressure of 0.3 to 0.4 Kg/cm$^2$. Accordingly, the enzyme-active time is relatively long and hence, properties of starch and proteins are changed by actions of the decomposing enzymes and excellent vermicelli pastes are difficult to obtain.

A feature of the present invention is that the decomposing enzyme-active time is shortened as much as possible so as to deactivate the decomposing enzymes immediately and eliminate the bad influences of the decomposing enzymes on vermicelli products, whereby vermicelli pastes of excellent viscoelasticity, texture, taste, eating feel and other properties can be obtained.

More specifically, the present invention relates to a process for preparing vermicelli which includes the step of kneading a vermicelli material by a steam-kneader having means for jetting compressed steam, and the present invention is characterized in that heated water and compressed steam are first supplied, the temperature of the vermicelli material is elevated to 50° C. within 15 to 60 seconds from the time the heated water is supplied and the steam-kneading operation is carried on for several minutes while continuing the supply of the compressed steam.

The protein content is not particularly critical in the starting wheat flour that is used as a main component of the vermicelli starting material. More specifically, in the present invention, even if low-protein wheat flour is used, properties are hardly changed except that starch is converted to $\alpha$-starch, and proteins are not decomposed and the texture-retaining property of glutein is compensated by the viscoelasticity of starch. Therefore, degradation of the resulting product does not occur at all. Additives other than wheat flour can optionally be incorporated in the vermicelli material. For example, powdery brine, skim milk, oil, fat, meat extract, table salt and amino acid salts may be incorporated. Further, other grain powders such as rice powder and buckwheat flour may be added. Moreover, vital glutein and dried alubmin may be added. Vital glutein and dried alubmin have a high water-compatibility and they exert excellent binding and spreading effects. Accordingly, these additives are very effective for forming a vermicelli paste by short-time kneading according to the present invention and the viscoelasticity can be remarkably enhanced.

As the most preferred additive that can be used with the present invention, there can be mentioned soybean flour. Soybean flour has high nutritive value. However, according to conventional methods, soybean flour can be incorporated only in an amount of 1 to 3%, because incorporation of too large an amount of soybean flour renders the vermicelli paste crumbly and locally stiff and lowers the spreading property of the vermicelli paste. Since wheat flour is different from soybean flour in texture and properties of starch and proteins, there is a difference of the $\alpha$-conversion speed between them. Further, since glutein is formed in wheat flour, assimilation is hardly caused between wheat flour and soybean flour. Accordingly, the viscoelasticity is not uniform in the resulting kneaded vermicelli paste. Another reason for reducing the soybean flour content to a lower level is that there is a smell inherent with soybean flour.

In the present invention, since the kneading treatment is conducted at a high temperature for a very short time, even if there is a difference of the $\alpha$-conversion speed between wheat flour and soybean flour, the $\alpha$-conversion is attained in the two substances to such an extent that the above difference of the $\alpha$-conversion speed may be ignored. Further, good assimilation is attained in the two substances by the kneading treatment. Therefore, the entire structure can be made uniform and a product free of brittleness can be obtained. Still further, since in the kneading step the $\alpha$-conversion treatment is performed by compressed steam, the smell inherent in soybean flour can be removed. Accordingly, in the present invention, the above-mentioned defects involved in the conventional methods do not occur even if soybean flour is incorporated in an amount of up to 20 parts per 100 parts of wheat flour.

When soybean flour is incorporated, the effect of the alcohol treatment (described hereinafter) can be enhanced.

More specifically, soybean proteins are insoluble in alcohol and therefore, during the alcohol treatment, they prevent alcohol from permeating into the interior of the vermicelli paste and exert the effect of retaining the alcohol in the surface portion of the vermicelli paste.

A vermicelli material comprising wheat flour as the main component and optional additives such as mentioned above is charged in a steam-kneader having means for jetting compressed steam. By the term "steam-kneader" is meant an apparatus comprising means for agitating a vermicelli material and means for jetting compressed steam into the vermicelli material being agitated.

The vermicelli material charged to this apparatus is subjected to the steam-kneading treatment to elevate the temperature of the vermicelli material. For this purpose, heated water is first supplied, and compressed steam is jetted immediately after or simultaneously with supply of the heated water.

The temperature of the heated water may be within the range of 36° to 60° C. If the temperature is too low, a sufficient temperature elevation curve cannot be obtained. If the temperature of the supplied water is higher than 60° C. the temperature of the vermicelli material may be elevated above 50° C. very quickly. In this latter case, although the activity of decomposing enzymes is preferably controlled, starch contained in the vermicelli material is converted to $\alpha$-starch too promptly and the vermicelli material is gelatinized, which results in a reduction of the effect of blowing of compressed steam, which will be described hereinafter.

If the temperature of the supplied water is in the above-mentioned range, no particular disadvantage is brought about, but it is preferred that the temperature of the supplied water be between 45° and 60° C., and most preferably between 50° and 60° C.

In general, the amount of heated water to be supplied to the vermicelli material is between about 35 and 40 parts per 100 parts of the vermicelli material, though this proportion can be changed depending on the content of wheat flour in the vermicelli material.

Heated water is thus supplied, and the vermicelli material is gradually rendered dumpling while it is being agitated by the steam-kneader. However, $\alpha$-conversion is not caused in the vermicelli paste.

In general, it is preferred that compressed steam be introduced just after the heated water is added. If necessary, however, the supply of compressed steam may be started simultaneously with the supply of the heated water.

By introducing the compressed steam, the temperature of the vermicelli material, which has been heated to some extent by the heated water, is elevated to 50° C. within 15 to 60 seconds from the start of the supply of the heated water, whereby the temperature range wherein the decomposing enzymes are active can be passed very quickly, and when the steam-kneading is continued and the temperature reaches a temperature higher than 60° C., starch in the vermicelli material is gradually converted from the $\beta$-state to the $\alpha$-state. The compressed steam forcibly expands the vermicelli material being under $\alpha$-conversion, by its jetting action, and as a result the entire paste is uniformly $\alpha$-converted.

In order to achieve the above conditions the pressure of compressed steam customarily used, namely 0.3 to 0.4 Kg/cm$^2$, is insufficient, and it is preferred that compressed steam be supplied under a pressure of 0.6 to 2.5 Kg/cm$^2$. Compressed steam having a pressure of 0.6 to 2.5 Kg/cm$^2$ has a temperature in the range of 111° to 140° C. FIG. 1 is a diagram illustrating approximately a linear relation between the pressure and temperature of steam. FIG. 1 illustrates data obtained when steam was introduced through a feed pipe from a boiler where steam was compressed to 10 Kg/cm$^2$ and the measurement was conducted on steam just before being supplied to the vermicelli material.

Table 2 shows a comparison of vermicelli prepared according to the present invention with vermicelli prepared under conventional conditions.

Table 2
Comparison of Product of Present Invention with Product of Convention Method

| Steam Temperature | Appearance | | | Texture | | | | Eating Feel | | Taste | |
|---|---|---|---|---|---|---|---|---|---|---|---|
| | Hue | Gloss | Shape | Viscoelasticity | Spreading Property | Shape-Retaining Property | Smoothness | Tooth cutting Property | Smell | Vermicelli Flavor | Integration with Soup |
| Conventional Method | white | slight | uniform | low | good, soft | unstable | good | soft | good | light | separated |
| Present Invention | yellowish white | good | slightly non-uniform | high | slightly resistant | stable | good | slightly hard | good | good | good harmony |

The process of the present invention is distinguishable over the conventional method in that the pressure of the compressed steam used is much higher than in the conventional method. If such high-pressure compressed steam is not used, it is impossible to elevate the temperature of the vermicelli material above 50° C. within 60 seconds, and hence, the desired improvement of properties cannot be attained. For example, if according to the conventional method water heated at 25° to 30° C. is supplied and the pressure of steam is adjusted to 0.3 to 0.4 Kg/cm$^2$, it takes 65 to 80 seconds for the temperature of the vermicelli material to be elevated to 50° C. Thus, properties of the resulting vermicelli are those of the conventional method as shown in Table 2. When water heated at 36° C. is supplied and the pressure of the supplied steam is adjusted to 0.6 Kg/cm$^2$, the temperature of the vermicelli material is elevated to 50° C. over a period of 60 seconds and the results shown in Table 2 are obtained.

When the temperature of the supplied water is adjusted to 60° C. and the pressure of the steam is adjusted to 2.5 Kg/cm$^2$ the temperature of the vermicelli material is elevated to 50° C. over a period of 15 seconds. If the temperature of the supplied water is maintained at 60° C. and the pressure of supplied steam is adjusted above 2.5 Kg/cm$^2$, the temperature of the vermicelli material is elevated to 50° C. within a time shorter than 15 seconds and the material is hardened by the abrupt change of the temperature and the resulting paste is browned. If the temperature of the supplied water is maintained within a range of 40° to 50° C. according to the present invention and the pressure of the supplied compressed steam is adjusted above 2.5 Kg/cm$^2$, although the temperature of the vermicelli material is elevated to 50° C. within 15 to 60 seconds and the activities of the decomposing enzymes can be controlled, since the jetting speed of the compressed steam having a pressure higher than 2.5 Kg/cm$^2$ is extremely high, there is a risk that the texture of wheat flour will be changed. Accordingly, it is preferred that the pressure of the compressed steam be not higher than 2.5 Kg/cm$^2$.

As will be apparent from the foregoing illustration, when the temperature of the supplied water is in the range of 36° to 60° C. it is preferred that the pressure of compressed steam be in the range of from 0.6 to 2.5 Kg/cm$^2$. In the instant specification and claims the pressure of the compressed steam is that measured just before jetting.

In the present invention, the pressure of the compressed steam is adjusted to 0.6 to 2.5 Kg/cm$^2$ as pointed out above (this pressure corresponds to a temperature of 111° to 140° C.). In the present invention, however, it is preferred that the pressure of the compressed steam to be supplied be 0.8 to 1.8 Kg/cm$^2$, and most preferably 1.1 to 1.5 Kg/cm$^2$.

Under the foregoing conditions, the temperature of the vermicelli material is elevated to 50° C. within a period of 15 to 60 seconds. For example, when the temperature of the heated water is 60° C. and the pressure of compressed steam is 1.5 Kg/cm$^2$, the temperature of the vermicelli material is elevated to 50° C. over a period of 36 seconds. It is preferred that this time for arrival to the point of 50° C. be 25 to 50 seconds, most preferably 30 to 45 seconds.

Compressed steam is fed from a boiler through a steam feed pipe and jetted into a mixer of the steam-kneader. It is preferred that the diameter of a blow-out opening of the steam feed pipe be diminished to some extent. The reason is that if the diameter is increased, the amount of jetted steam can be increased, but since the diameter of the jetted steam drops is increased a sufficient flow rate cannot be obtained when the steam impinges against the vermicelli paste, with the result that there is a risk that α-conversion in the vermicelli paste cannot be performed uniformly. In view of the foregoing, it is preferred that a great number of steam feed pipes be disposed in the steam-kneader and the diameter of the blow-out opening be small.

In the foregoing manner, the temperature of the vermicelli material is elevated to 50° C. within 15 to 60 seconds. Under the same conditions the compressed steam is further fed for several minutes to continue the steam-kneading treatment. The rise of the temperature during this treatment is shown in FIG. 2. Curve a shows the rise of the temperature in the conventional method, and curve b shows the rise of the temperature according to one embodiment of the present invention. Curve c shows the rise of the temperature in the case where the temperature of the vermicelli material is elevated above 50° C. within 15 seconds in which case the vermicelli paste loses its viscoelasticity and is hardened.

As will be readily understood from the results shown in FIG. 2, in the present invention the elevation of the temperature is continued even after the temperature reaches 50° C. Specifically, the temperature is elevated to a range of 60° to 90° C. where α-conversion of wheat starch takes place. Namely, at 60° C. α-conversion is initiated and the vermicelli material is converted to a paste. By continuously supplying compressed steam the vermicelli paste is expanded while being agitated, and as the temperature is gradually elevated, α-conversion is advanced uniformly in the entire paste, and when the temperature is elevated to 85° C., the volume of the vermicelli paste is about 3 times as large as the volume of the original vermicelli material, and α-conversion is substantially completed and a crude rubber-like vermicelli paste is obtained. When the temperature exceeds 85° C., the gradient of the temperature rise curve becomes gentle, and at 90° C. α-conversion is terminated. When the temperature exceeds 90° C. the volume of the vermicelli is diminished and the entire paste becomes compact. Thus, when the temperature of the vermicelli paste reaches 90° to 100° C., the steam-kneading treatment step is terminated. When the temperature is further elevated above 100° C., the paste is excessively hardened and the spreading property is reduced, and cracks are readily formed during the subsequent rolling step. Accordingly, the steam-kneading treatment should be terminated before the temperature of the vermicelli paste exceeds 100° C.

When the temperature at which the steam-kneading treatment is terminated is lower than 90° C., the vermicelli paste lacks compactness. Therefore another feature of the present invention is that the steam-kneading treatment is terminated after the temperature has been elevated to at least 90° C.

It is preferred that the steam-kneading treatment be terminated when the temperature is elevated to at least 98° C. However, nearly the same results can be obtained when the steam-kneading treatment is stopped at 96° C. In short, the steam-kneading treatment is preferably terminated when the temperature of the vermicelli paste is in the range of 96° to 100° C. When the temperature of heated water is in the range of 36° to 60° C. and the pressure of the compressed steam is 0.6 to 2.5 Kg/cm² it takes about 8 minutes under the lowest temperature and pressure conditions or about 4 minutes under the highest temperature and pressure conditions for the temperature of the vermicelli material to rise from 50° C. to 100° C. Accordingly, in the present invention the steam-kneading treatment is continued for 3 to 7 minutes after the temperature has been elevated to 50° C. The relation between time and temperature is illustrated in FIG. 3 (which is derived from Examples 1–8 that are set forth hereinafter).

The pressure in the mixer of the steam-kneader is elevated above atmospheric pressure by jetting of compressed steam, and the temperature of the jetted steam is higher than 100° C. When jetting is continued for a long time, the temperature of the vermicelli paste often exceeds 100° C. If the paste temperature exceeds 100° C., unlike the case of prompt heating, the texture of α-starch is changed and the paste becomes dull. Accordingly, it is not desirable to conduct the steam-kneading operation for more than 10 minutes after the temperature of the vermicelli material has been elevated to 50° C. When the temperature of the vermicelli material is elevated to 50° C. over a period shorter than 15 seconds, as in the case shown by the curve c in FIG. 2, the temperature of the vermicelli paste exeeds 100° C. and the paste is browned, loses its viscoelasticity and swelling property and becomes brittle. Thus, a semi-transparent, yellowish white paste high in viscoelasticity, as obtained according to the present invention, cannot be obtained at all.

The present invention is directed to a process for preparing vermicelli pastes according to the foregoing procedures. The so prepared vermicelli pastes are processed into vermicelli products according to customary methods which include rolling the vermicelli paste and cooling and cutting the rolled paste to form a raw steamed vermicelli or rolling a vermicelli paste, cooling and cutting the rolled paste and then heating, drying and cooling the cut paste to form a dried steamed vermicelli.

According to the present invention, during the above processing method, an alcohol dipping treatment can be conducted, whereby the preservability of the resulting processed vermicelli product can be further enhanced. In the present invention, since the entire structure of the vermicelli paste is α-converted and subjected to the steam-kneading treatment at a temperature higher than the α-converstion temperature, the texture of the steam-kneaded vermicelli paste is very compact. Accordingly, this can be conveniently subjected to an alcohol dipping treatment having a high sterilizing effect. When a vermicelli paste prepared according to the conventional method is subjected to the alcohol dipping treatment, the alcohol permeates into the texture of the paste during the dipping step, and the taste is changed. Accordingly, this treatment cannot be regarded as a good sterilizing and preserving treatment.

In the present invention, since the vermicelli paste is entirely α-converted and is heated at a temperature higher than the α-conversion temperature, i.e. 90° C., the texture of the vermicelli paste is rendered very compact and hence, the amount of the permeating alcohol is about ¼ of the amount of the permeating alcohol in the conventional method. As a result, the alcohol is distributed mainly in the surface portion and an alcohol layer is formed in the surface portion. This alcohol layer prevents drying of the vermicelli texture during preservation and therefore, reconversion of the α-texture to the β-texture can be effectively prevented and the resulting processed steam-kneaded vermicelli retains excellent properties for a long time.

It is preferred that this alcohol dipping treatment be carried out after the vermicelli paste of the present invention (after rolling and cutting into lines) has been aged for 5 to 25 hours. Further, it is preferred that this aging treatment be conducted at a temperature of 12° to 20° C. and a relative humidity of 40 to 60%. If the aging time is shorter than 5 hours, the vermicelli paste shrinks and deformation is readily caused. If the aging time is longer than 25 hours, the vermicelli paste is completely aged, and the texture is hardened and becomes brittle.

No particular disadvantage is brought about if the aging time is 5 to 25 hours. However, it is preferred that the aging be conducted for 10 to 20 hours and most preferably 15 to 18 hours. Influences of the aging time (0 to 75 hours) on properties of the resulting vermicelli product are shown in Example 11.

The so aged vermicelli paste is subjected to the alcohol dipping treatment. The alcohol concentration is appropriately chosen depending on the intended preservation period of the product. When it is necessary to preserve the vermicelli product for more than 3 months, the alcohol concentration is preferably about 75%, and when the preservation period is to be 1 to 3 months, the alcohol concentration is preferably about 60%. If the preservation period is to be shorter than 1 month, the alcohol concentration is preferably about 50%.

When soybean flour is used as an additive to the vermicelli material, the effect of this alcohol dipping treatment can be remarkably enhanced as pointed out hereinbefore. Since soybean proteins are insoluble in alcohol, they prevent the alcohol from permeating into the interior of the vermicelli paste, and the alcohol is retained only in the surface portion.

In order to remove the adhering alcohol, it is preferred to subject the resulting linear vermicelli to an alcohol shake-off treatment.

Thus, preparation of vermicelli products according to the present invention is completed.

THE DRAWINGS

EXAMPLES

Figure 1:
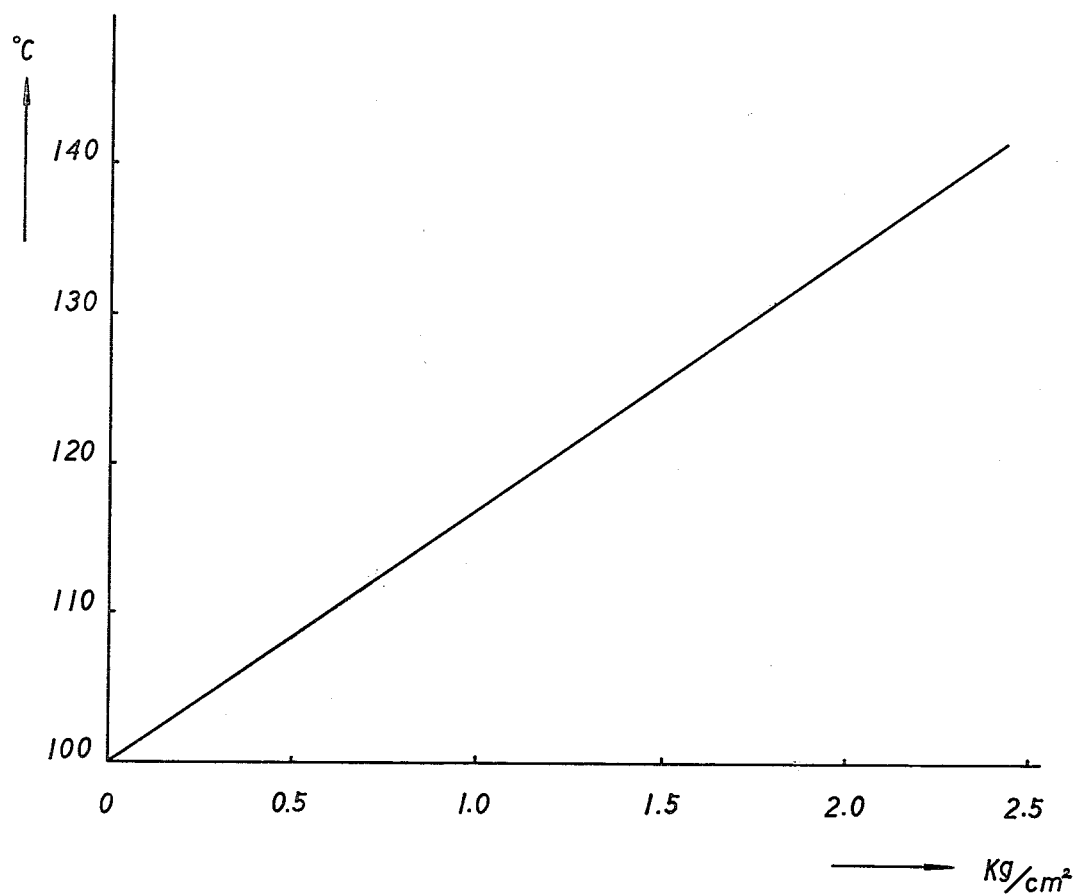
FIG. 1 is a graph illustrating the relation between the pressure of steam and the temperature of steam.
Figure 2:
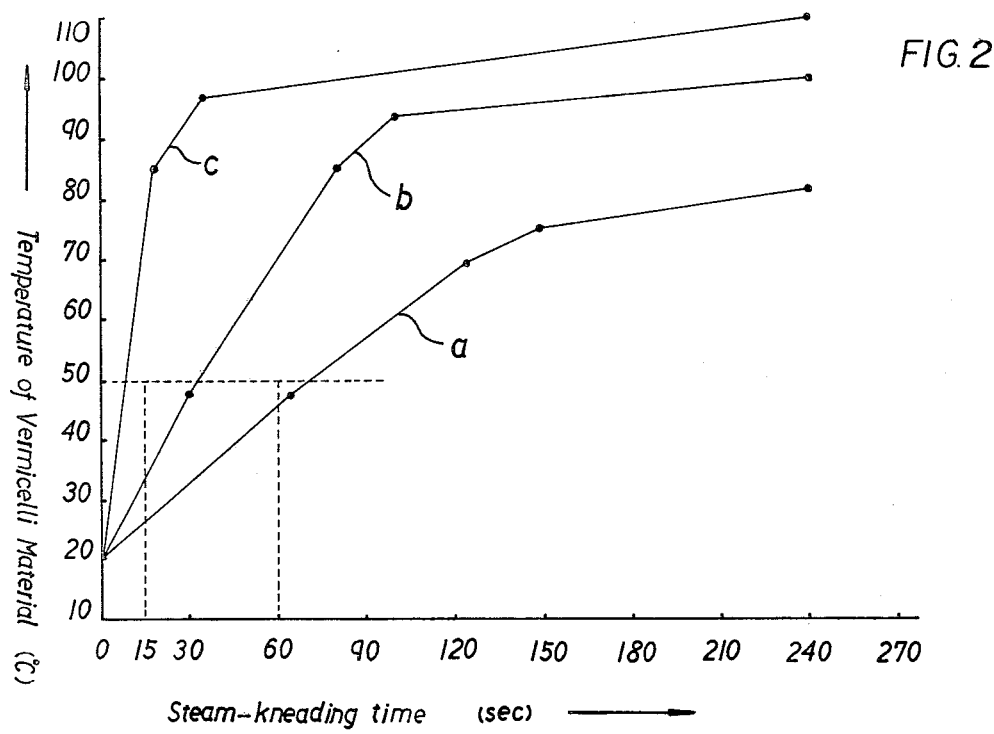
FIG. 2 illustrates the relation between the steam-kneading time and the rise of the temperature of the vermicelli material in three examples.
Figure 3:
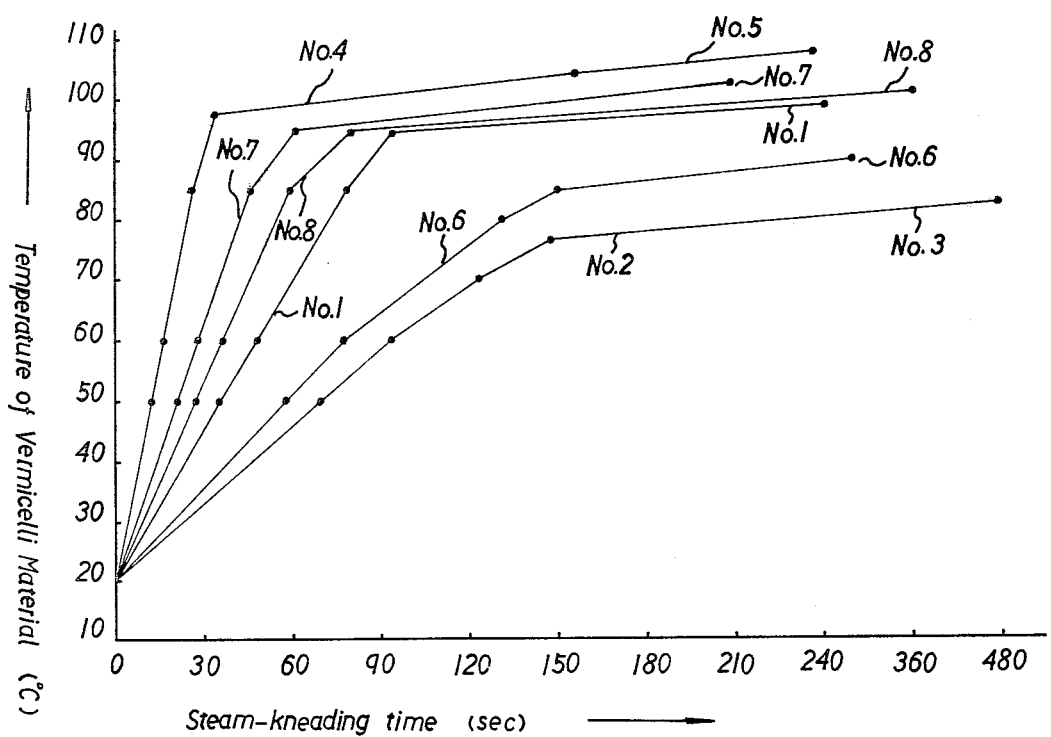
FIG. 3 illustrates the relation between the steam-kneading time and the rise of the temperature of the vermicelli material in Examples 1 to 8.

The present invention will now be described by reference to the following Examples, but it will be understood that the invention is not limited thereby.

EXAMPLE 1

A vermicelli starting material having the following composition

| Raw materials | Amounts (Kg) |
| --- | --- |
| Semi-Fortified Flour of First Class | 60 |
| Medium Fortified Flour of First Class | 40 |
| Meat Extract | 0.5 |
| Rice Oil | 0.3 |

-continued

| Raw materials | Amounts (Kg) |
| --- | --- |
| Emulsifier | 0.02 |
| Table Salt | 1.8 | was charged into a steam-kneader and 38 l of hot water maintained at 60° C. was added thereto. The lid of the kneader was immediately closed and a pressure valve was adjusted to blow in steam having a pressure of 1.5 Kg/cm$^2$. The rotation speed of the mixer in the kneader was adjusted to 160 rpm. The temperature of the vermicelli material was elevated to 50° C. over a period of 60 seconds. Under the same conditions, the steam-kneading treatment was continued and an additional 80 seconds were required for the temperature to be elevated to 85° C., an optimum temperature for α-conversion. When 245 seconds had elapsed from the start of the treatment, the steam-kneading treatment was terminated. At this point, the temperature of the vermicelli paste was 98° C. This paste was semi-transparent and yellowish white. It was high in the viscoelasticity and excellent in the texture compactness and other properties. Results of the tests made on this vermicelli paste are shown in Tables 3 and 4.

EXAMPLES 2 TO 8

Other vermicelli pastes were prepared in the same manner as described in Example 1 except that the temperature of the hot water, the pressure of the compressed steam and the steam-kneading treatment time were changed as shown in Tables 3 and 4. Results of the tests made on the so prepared vermicelli pastes are also shown in Tables 3 and 4.

EXAMPLES 9 AND 10

Other vermicelli pastes were prepared in the same manner as described in Example 1 except that the vermicelli starting material set forth below was used in Example 9.

| Raw Materials | Amounts (Kg) |
| --- | --- |
| wheat flour | 88 |
| soybean protein flour | 12 |
| dried albumin | 1 |
| meat extract | 0.3 |
| rice oil | 0.3 |
| table salt | 1.8 |
| supplied water | 38 l |
| Total | 141.4 | and another vermicelli starting material was used in Example 10, as follows:

| Raw Materials | Amounts (Kg) |
| --- | --- |
| wheat flour | 70 |
| buckwheat flour | 30 |
| dried albumin | 1 |
| locust bean gum | 0.2 |
| rice oil | 0.3 |
| table salt | 1.8 |
| supplied water | 37.1 |
| Total | 140.3 |

Results of the tests made on the so prepared vermicelli pastes are shown in Tables 3 and 4.

Table 3

| Example No. | Temperature(°C.) of Supplied Water | Steam Pressure (Kg/cm²) | Time(seconds) for arrival at 50° C. | Time(seconds) for arrival at 60° C. | Time(seconds) for arrival at 85° C. | Time(seconds) for Completion of Kneading | Temperature (°C.) at termination of Kneading | Processa-bility | Evaluation | Mark |
|---|---|---|---|---|---|---|---|---|---|---|
| 1 | 60 | 1.5 | 36 | 50 | 80 | 245 | 98 | good | viscoelastic, uniform α-conversion | ◯ |
| 2 | 25 | 0.4 | 70 | 100 | not reached | 240 | 76 | bad | highly sticky, white, non-uniform | X |
| 3 | 25 | 0.4 | 70 | 100 | " | 480 | 83 | bad | soft, sticky | X |
| 4 | 70 | 2.9 | 12 | 17 | 27 | 160 | 103 | bad | stiff, hardened | △ |
| 5 | 70 | 2.9 | 12 | 17 | 27 | 240 | 107 | bad | discolored, hardened | △ |
| 6 | 36 | 0.6 | 60 | 80 | 180 | 300 | 90 | fair | soft | ◯ |
| 7 | 60 | 2.5 | 22 | 29 | 48 | 210 | 101 | fair | stiff, increased tensile strength | ◯ |
| 8 | 65 | 2.0 | 29 | 38 | 61 | 360 | 100 | fair | stiff, hardened, smooth surface | ◯ |
| 9 | 60 | 1.5 | 33 | 47 | 77 | 250 | 98 | good | viscoelastic, uniform α-conversion | ◉ |
| 10 | 60 | 1.5 | 36 | 50 | 80 | 245 | 98 | good | viscoelastic, uniform α-conversion | ◉ |

Notes
◉: excellent, ◯: good, △: fair, X: bad

Table 4
Influences of Steam Pressure and Temperature Elevation Rate on States of Pastes Obtained in Examples

| Example No. | Appearance Hue | Appearance Gloss | Shape | Texture Viscoelasticity | Texture Spreading Property | Texture Shape-Retaining Property | Eating Feel Touch | Eating Feel Crisp | Taste Smell | Taste Vermicelli Flavor | Taste Integration with Soup | Pressure (Kg/cm$^2$) |
|---|---|---|---|---|---|---|---|---|---|---|---|---|
| 1 | yellowish white | excellent | uniform | high | spreadable, good tensile property | stable | smooth | good | good | good | good | 1.5 |
| 2 | white | no gloss (spots) | unstable | low, weak | spreadable | unstable (spongy) | very smooth | bad (soppy) | powdery smell | powdery | separated | 0.4 |
| 3 | " | no gloss | " | " | " | " | smooth and soft | " | slight powdery smell | slightly powdery | " | 0.4 |
| 4 | yellowish brown | amber | slightly irregular | hard | hard, no spreadable | strong | hard | bad (pithy) | sweet | cracker like flavor | " | 2.9 |
| 5 | brown | " | irregular | very hard | not spreadable | strong | hard | " | burn smell | crumbling | " | 2.9 |
| 6 | light white | slight gloss | slightly uniform | soft | spreadable, low tensile property | swelling | smooth and soft | soft | fair | light | long time required for integration | 0.6 |
| 7 | light yellow brown | good | slightly uniform | high | slightly spreadable good tensile property slightly | hardly swelling | elastic | resembling spaghetti | fair | hard | long time required for integration | 2.5 |
| 8 | light yellow brown | good | slightly uniform | very high | spreadable, good tensile property | hardly swelling | " | resembling spaghetti | slightly smell | hard | long time required for integration | 2.0 |
| 9 | yellowish white | excellent | uniform | high | good tensile property | stable | smooth | good | good | excellent | good | 1.5 |
| 10 | yellowish white | " | " | high | good tensile property | " | " | good | good | " | good | 1.5 |

EXAMPLE 11

The vermicelli paste obtained in Example 1 was rolled at a temperature of 70° to 90° C. and the rolled paste was immediately transferred to a cooling conveyer to cool the vermicelli paste to room temperature over a period of 5 to 10 minutes. Then, the paste was cut into linear pieces having a width of 2.0 mm and a length of 42 cm, and was aged for various periods and subjected to the alcohol dipping treatment. The texture of the vermicelli paste was easily compacted and excellent properties were obtained. Tests results are shown in Table 5.

Table 5

Results of Aging Tests

| Item | 0 hour | 1 hour | 2 hours | 3 hours | 4 hours | 5 hours | 25 hours | 50 hours | 75 hours |
|---|---|---|---|---|---|---|---|---|---|
| Appearance | | | | | | | | | |
| Touch | unaged solid | unaged solid | green solid | green solid | stable slightly solid | aged slightly solid | completely aged linear | completely aged linear | completely aged linear |
| Shape-Retaining Property | dumpling, difficulty broken | breaking is troublesome | breaking is troublesome | breaking is troublesome | soft | soft | hardened texture | hardened texture | uniform texture |
| Shape / Hue & Gloss | light brown | light brown | green | green | green | green | whitish green | whitish green | whitish green |
| Properties | | | | | | | | | |
| Spreading Property | 52.0 | 54.0 | 55.0 | 61.0 | 62.0 | 61.0 | 57.0 | 54.0 | 56.0 |
| Elasticity | Shrunk to 38 cm, Weak 4.0 times | Weak 5 times | Weak 6 times | partially strong 5 times | slightly strong 5.5 times | strong 6 times | tough 4 times | high tensile strength, too strong 4.5 times | high tensile strength, uniformly strong 6 times |
| Resistance to Twisting | brittle | fair | crude rubber-like, good | good | good | crude rubber-like, good | highly resistant to twisting | highly resistant to twisting | strong |
| Cut Fragment | not adhering | not adhering | not adhering | not slightly adhering | slight slightly adhering | slight not adhering | slight | slight | slight |
| Cutting Quality | | | | | | | linearly cut | stiff, linearly cut | stiff, linearly cut |
| Preservability | | | | | | | | | |
| Water Retention(%) | 42.0 | 42.0 | 41.5 | 42.0 | 41.5 | 42.0 | 40.5 | 41.5 | 42.0 |
| Packing Property inner | good | good | good | good | good | good | good | slightly difficult | difficult |
| outer | bad | bad | bad | bad | slightly bad | good | excellent | excellent | excellent |
| Commercial Value | | | | | | | | | |
| Appearance | good | good | good | good | good | good | good | slightly hardened | hardened |
| Quality | bad | bad | bad | bad | slightly bad | good | good | stable | hardened |
| Preservability | | | | | | | good | unstable | unstable |

More or less detailed claims will be presented hereinafter and even though such claims are rather specific in nature, those skilled in the art to which this invention pertains will recognize that there are obvious equivalents for the specific materials amounts and ranges recited therein. Some of these obvious equivalents are disclosed herein, other obvious equivalents will immediately occur to one skilled in the art and still other obvious equivalents could be readily ascertained upon rather simple, routine, non-inventive experimentation. Certainly no invention would be involved in substituting one or more of such obvious equivalents for the materials specifically recited in the claims. I intend that all such obvious equivalents be encompassed within the scope of this invention and patent grant in accordance with the well-known doctrine of equivalents, as well as changed proportions of the ingredients which do not render the composition unsuitable for the disclosed purposes.

Specifically, materials which are considered to be obvious equivalents of vermicelli are spagetti, macaroni and pasta and it is intended that these materials be encompassed by the claims under the doctrine of equivalents.

What is claimed is:

1. A process for preparing vermicelli products which comprises:
   (a) introducing into a kneading vessel
      (1) a vermicelli material, and
      (2) 35–40 parts of water per 100 parts of vermicelli material, said water being at a temperature of 36°–60° C.,
   (b) introducing into the kneading vessel compressed steam under a pressure of 0.6–2.5 Kg/cm$^2$, and thereby causing steam kneading of the contents, said steam being introduced into the kneading vessel at the same time as said water or just after the water is added,
   (c) elevating the temperature of the vermicelli material in the kneading vessel to 50° C. within a period of 15 to 60 seconds with the introduced steam,
   (d) continuing the steam-kneading in the kneading vessel until the temperature of the vermicelli material is elevated to the range of 90°–100° C., and
   (e) recovering a semi-transparent, yellowish white vermicelli paste high in viscoelaesticity.

2. A process according to claim 1 wherein the temperature of said water in step (a)(2) is 45°–60° C.

3. A process according to claim 1 wherein the pressure of the compressed steam is 0.8–1.8 Kg/cm$^2$.

4. A process according to claim 1 wherein the pressure of the compressed steam is 1.1–1.5 Kg/cm$^2$.

5. A process according to claim 1 wherein the time period in step (c) is 30–45 seconds.

6. A process for preparing steam-kneaded vermicelli pastes according to claim 1 wherein the vermicelli material includes at least one additive selected from the group consisting of soybean flour, buckwheat flour, powdery brine, skim milk, oil, fat, meat extract, table salt, amino acid salts, vital gluten and dried albumen.

7. A process for preparing steam-kneaded vermicelli pastes according to claim 1 wherein the temperature of the vermicelli material in step (d) is 96° to 100° C.

8. A process according to claim 1 wherein the vermicelli paste resulting from step (d) is rolled, cut and aged for 5 to 25 hours, and the aged cut paste dipped in an alcohol solution.

9. A process according to claim 5 wherein the vermicelli material contains soybean flour as an additive.

* * * * *